United States Patent
Berg et al.

(10) Patent No.: US 6,444,319 B1
(45) Date of Patent: Sep. 3, 2002

(54) METHOD FOR THE SURFACE COATING OF AN INTERIOR FITTING AND INTERIOR FITTING PRODUCED ACCORDING THERETO

(75) Inventors: Matthias Berg, Unterensingen; Thomas Hempel, Steinheim; Ralf Kupferer, Stuttgart, all of (DE)

(73) Assignee: Erwin Behr GmbH & Co. KG, Wendlingen (DE)

( * ) Notice: Subject to any disclaimer, the term of this patent is extended or adjusted under 35 U.S.C. 154(b) by 0 days.

(21) Appl. No.: 09/699,042

(22) Filed: Oct. 27, 2000

Related U.S. Application Data

(63) Continuation of application No. PCT/EP99/01143, filed on Feb. 23, 1999.

(30) Foreign Application Priority Data

Apr. 29, 1998 (DE) .......................................... 198 19 133

(51) Int. Cl.⁷ ........................... B32B 27/38; B29C 33/48
(52) U.S. Cl. .................... 428/413; 428/423.1; 428/457; 428/480; 425/135; 425/437; 425/438; 425/546; 425/549; 425/565
(58) Field of Search ............................... 428/423.1, 480, 428/413, 457; 425/546, 549, 565, 135, 437, 438

(56) References Cited

U.S. PATENT DOCUMENTS 4,647,274 A * 3/1987 Oda .......................... 425/135
4,647,274 A 3/1987 Oda .......................... 425/135

FOREIGN PATENT DOCUMENTS

DE 35 20 318 12/1986
DE 43 20 893 7/1994

OTHER PUBLICATIONS

German publication "Stand der Technik bei 2K–Lacken" (State of the Art of lacquers having 2 components), published in the Journal "JOT" 1997/12, p. 28–32.

* cited by examiner

Primary Examiner—Leszek Kiliman
(74) Attorney, Agent, or Firm—Barry R. Lipsitz; Douglas M. McAllister

(57) ABSTRACT

So that a method for the surface coating of an interior fitting for vehicles with a lacquer or resin layer, in which the interior fitting to be coated is inserted into a cavity of a molding tool, the inner wall of which is at a defined distance from the interior fitting in the region of the interior fitting surface to be coated and thereby forms a clearance extending over the entire surface to be coated and having a substantially constant thickness, and in which a liquid surface coating material is introduced into the clearance and is cured there, can be developed in such a way that the quality of the surface coating is improved as far as possible without additional after-working, it is proposed that the surface coating material have at least two components which are mixed with one another in a mixing and feeding assembly immediately before the filling of the clearance and are fed to the clearance, and that, after the clearance has been filled, the molding tool be separated from the mixing and feeding assembly and the surface coating material in the clearance be cured substantially under atmospheric pressure.

17 Claims, 1 Drawing Sheet

Figure 1:
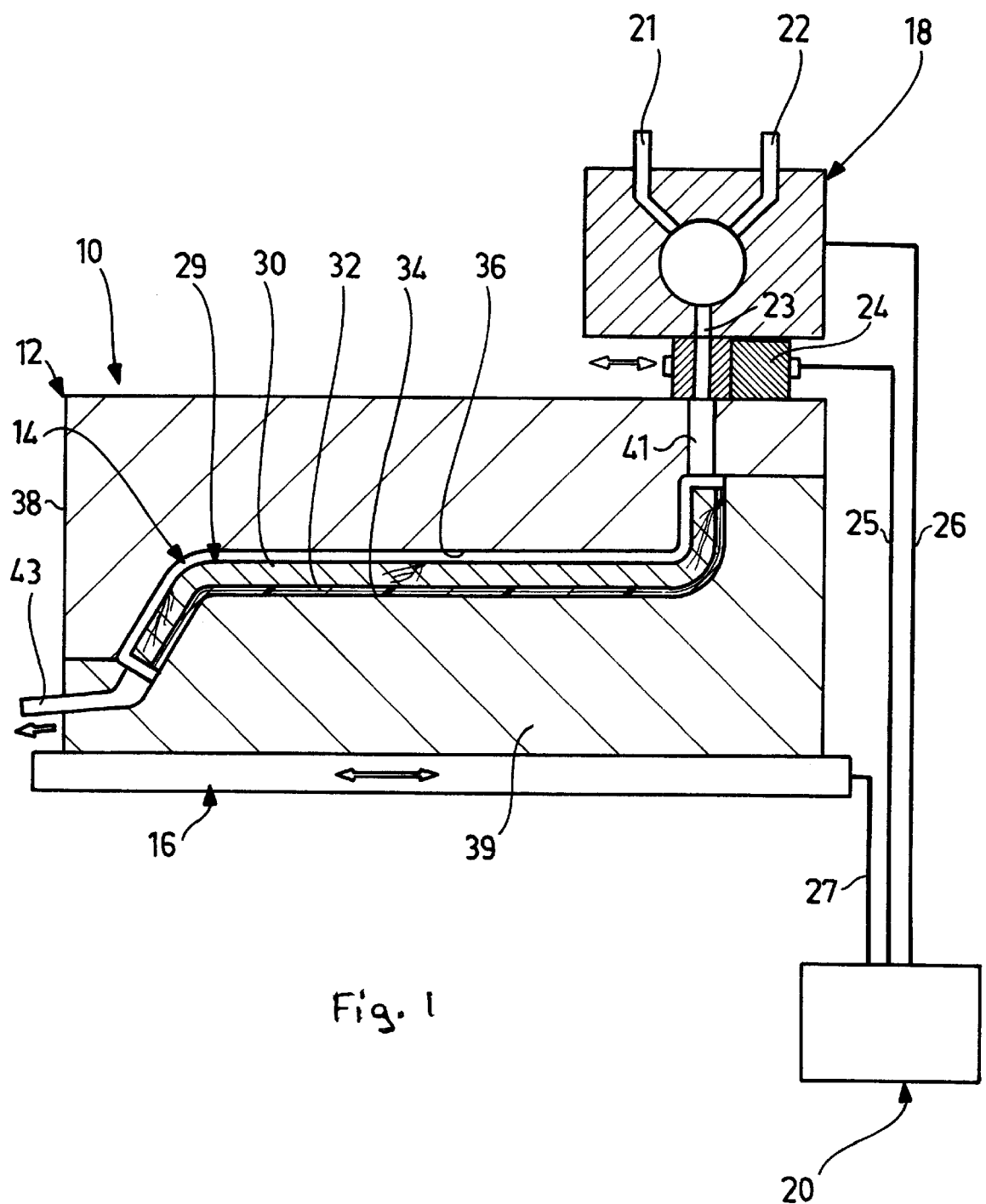

METHOD FOR THE SURFACE COATING OF AN INTERIOR FITTING AND INTERIOR FITTING PRODUCED ACCORDING THERETO

The present disclosure is a continuation to the subject matter disclosed in International Application No. PCT/EP99/01143 (WO 99/55511) of Feb. 23, 1999, the entire specification of which is incorporated herein by reference.

The present invention relates to a method for the surface coating of an interior fitting for vehicles, for example of a shaped wooden part, with a lacquer or resin layer, in which the interior fitting to be coated is inserted into a cavity of a molding tool, the inner wall of which is at a defined distance from the interior fitting in the region of the interior fitting surface to be coated, in particular in the region of a visible side of the interior fitting, and thereby forms, between the inner wall and the surface to be coated, a clearance extending over the entire surface to be coated and having a substantially constant thickness, and in which a liquid surface coating material is introduced into the clearance and is cured there.

Interior fittings of this type, with a lacquered surface, are used, for example, for fitting out the interior of motor vehicles. In this context, in particular, shaped wooden parts are employed, which may take the form of solid components or veneered components, the latter usually being provided on their rear side with a reinforcing element composed, for example, of plastic. A transparent lacquer or resin layer is applied to the visible side of the interior fittings, so that a usually glossy and hard-wearing surface is obtained and, in the case of shaped wooden parts with a transparent surface coating, the structure of the wood not only remains visible, but is additionally emphasised. For this purpose, the shaped wooden part is conventionally provided with a lacquer layer having a thickness of approximately 0.5 mm to about 0.8 mm, since this results in a visually attractive "depth effect".

In conventional production methods, surface coating materials employed as lacquers or resins are sprayed or painted onto the surfaces to be coated. In this case, in general, a plurality of layers are necessary, in order to acquire, on the one hand, the desired sealing and, on the other hand, also a surface which is as glossy as possible. So that the surfaces are free of inclusions and completely uniform, it is necessary to take enhanced precautionary measures. Moreover, spraying or painting makes it necessary, as a rule, to carry out an after-treatment. Thus, for example, in order to achieve the depth effect initially mentioned, it is necessary for lacquer layers to be applied successively in a plurality of steps until a layer thickness of 0.8 mm is achieved. The lacquer layer is then reduced again, by grinding and polishing, to a layer thickness of approximately 0.5 mm which then satisfies the desired visual requirements.

Instead of spraying or painting the surface coating materials onto the interior fitting, it has already taken proposed in DE 43 20 893 C1 to insert the interior fitting into a molding tool, the inner wall of which is at a slight distance from the interior fitting in the region of the interior fitting surface to be coated and thereby forms, between the inner wall and the surface, a clearance extending over the entire surface to be coated and having a substantially constant thickness. Subsequently, in the known method, the liquid surface coating material is introduced into the clearance and is then cured there. In order to ensure that there are no gas bubbles embedded in the surface layer, in the method known from DE 43 20 893 C2 the clearance is evacuated and the liquid surface coating material is introduced into the clearance during evacuation or thereafter.

It is known from U.S. Pat. No. 4,647,274 to coat an interior fitting for vehicles in a molding tool, in such a way that, in the region of the interior fitting surface to be coated, a liquid surface coating material having two components is introduced, which is cured in the molding tool under pressure and heat load.

In many cases, a satisfactory surface quality is achieved by means of the known method. It was shown, however, that a lacquer layer satisfying the most stringent requirements cannot be produced in all instances.

The object of the present invention is to develop the generic method in such a way that the quality of the surface coating is improved as far as possible without additional after-working.

In a method of the type initially described, this object is achieved, according to the invention, in that, after the clearance has been filled, the molding tool is separated from the mixing and feeding assembly and the surface coating material in the clearance is cured substantially under atmospheric pressure.

The method according to the invention employs as surface coating material a mixture of at least two components which are mixed with one another only immediately before the filling of the clearance. The surface coating material is introduced into the clearance by means of the feeding assembly and the mixing and feeding assembly is subsequently separated from the molding tool. The curing of the surface coating material in the clearance then takes place substantially under atmospheric pressure. It was shown, surprisingly, that curing under atmospheric pressure results in a particularly good quality of the surface coating.

The filling of the clearance with surface coating material advantageously takes place with particular uniformity in all the regions of the clearance if the surface coating material is introduced into the clearance by means of overpressure or underpressure. It can be provided that the surface coating material is pressed into the clearance. Alternatively, the clearance may be at least partially evacuated before or during filling. In the method according to the invention, however, an overpressure or underpressure is applied only during the filling of the clearance, while the curing of the liquid surface coating material takes place under atmospheric pressure.

The method can be carried out particularly cost-effectively when the molding tool inner wall facing the interior fitting surface to be coated is finished with an optical surface quality, for example polished with a high gloss. Further working of the surface of the interior fitting provided with a lacquer or resin layer may thereby be dispensed with.

It is beneficial if the molding tool inner wall facing the interior fitting surface to be coated is produced from high-grade steel, rustproof, acid-resistant, hardenable steel, silicon, ceramic or aluminum. Materials of this type have high resistance to the usually aggressive lacquers or resins which can be provided for surface coating. Since the curing of the liquid surface coating material takes place under atmospheric pressure and not under overpressure, even brittle ceramic material may be employed in order to form the inner wall.

In a particularly preferred embodiment of the method according to the invention, there is provision for the molding tool inner wall, facing the interior fitting surface to be coated, to be hard-chrome plated since particularly good resistance to lacquers and resins can be achieved thereby.

It is advantageous if the at least two components of the liquid surface coating material are mixed with one another homogeneously immediately before the filling of the clearance and are fed to the molding tool at an approximately constant flow velocity. Feeding the mixture of surface coating material as uniformly as possible prevents the formation of gas bubbles, so that a particularly good surface coating can be achieved without any after-working.

During curing under atmospheric pressure, any gas bubbles possibly present can rise up into a filling duct connecting the clearance to the connection of the molding tool to the mixing and feeding assembly or into a venting duct or riser, so that, after curing, the surface coating is not impaired by gas bubbles present. It is particularly advantageous, however, if the surface coating material is fed to the clearance so as to be virtually free of bubbles, since this ensures that a particularly homogeneous and uninterupted quality of the surface coating is achieved.

Synthetic resins on a polyurethane, polyester, acrylic or epoxy base may preferably be used as liquid surface coating material.

The curing of the liquid surface coating material introduced may be assisted in that sensitizers sensitive to UV radiation are admixed with the liquid surface coating material and, during curing, the liquid surface coating material is exposed to UV radiation. In this case, the UV radiation may be fed into the molding tool via light guides. There may also be provision, however, for using a radiation-permeable glass or plastic mold. A reduction in the curing times may also be achieved by exposing the molding tool to heat during curing. It is also advantageous if the surface coating material is exposed to electromagnetic radiation, in particular microwave radiation, during curing, so that the interior fitting with a cured surface coating can thereby be removed from the molding tool in a particularly short time.

As already explained, there may be provision for removing the coated interior fitting from the molding tool after curing and then leaving the interior fitting without any further surface working.

The method according to the invention is employed, in particular, for the surface coating of the visible face of the interior fitting. Preferably, however, there is also provision for also covering edge regions of the interior fitting with the surface coating material by virtue of a corresponding design of the molding tool. Moreover, there may be provision for arranging the interior fitting within the molding tool in such a way that a clearance is formed on all sides between the surface of the interior fitting and the inner wall of the molding tool. Coating of the interior fitting on all sides can be achieved as a result. If only the visible face of the interior fitting is to be coated, this is laid with its rear side facing directly onto the inner wall of the molding tool, so that a clearance between the interior fitting surface to be coated and the inner wall of the cavity is arranged only in the remaining surface regions. Particularly in the case of the interior trim of motor vehicles, it is usually sufficient to coat only the visible side, facing the interior, of the interior fitting, whilst its rear side can remain essentially uncoated.

It may also be envisaged to coat the rear side of the interior fitting partially with surface coating material by means of the method according to the invention.

As already described, the surface coating material is introduced in the liquid state into the clearance by means of the mixing and feeding assembly. The surface coating material comprises at least two components. In this case, there may be provision for one of the components to have a solid consistency, at least in the initial state, for example in the form of a granulate or powder. Thus, for example, in the case of accelerated curing by means of UV radiation, pulverulent sensitizers may be provided as one component of the surface coating material.

The invention described extends, of course, not only to the method described above, but also to interior fittings, in particular shaped wooden parts, which are produced using this method.

The following description of a preferred embodiment of the invention serves, together with the drawing, for a more detailed explanation.

The FIG. 1 illustrates diagrammatically a plant for the surface coating of a shaped wooden part. The plant is given the reference symbol 10 in the drawing and comprises essentially a two-part molding tool 12, which forms a cavity 14 closed on all sides, a transport device 16, on which the molding tool 12 can be moved, and also a mixing and feeding assembly 18 and a control unit 20.

In the exemplary embodiment illustrated, the mixing and feeding assembly comprises two filling connections 21 and 22 and an outlet 23 which can be opened and closed via an electrically controllable solenoid valve 24. The activation of the solenoid valve 24 and also the activation of the mixing and feeding assembly 18 and the activation of the transport device 16 are carried out by means of the control unit 20 which is coupled electrically to the solenoid valve 24, to the mixing and feeding assembly 18 and to the transport device 16 via control lines 25, 26 and 27.

An interior fitting 29 in the form of a wood veneer component 30 with a reinforcing element 32 arranged on its rear side is inserted into the cavity 14 of the molding tool 12. The shape of the cavity 14 is selected such that it is adapted to the shape of the interior fitting 29. The interior fitting 29 rests with its rear side face onto the inner wall 34 of the cavity 14, while a clearance 36 is formed between the inner wall 34 of the cavity 14 and the surface of the interior fitting 29 in the region of the visible side to be coated of the interior fitting 29. The thickness of the clearance may be, for example, between 0.1 mm and 1.5 mm, depending on the desired thickness of the surface coating; the thickness of the clearance preferably amounts to approximately 0.5 mm.

The molding tool 12 is designed in two parts and comprises an upper mold 38 and a lower mold 39, so that, by the two molds being separated, the cavity 14 is accessible for the insertion and removal of the interior fitting 29. The cavity 14 is flow-connected to the mixing and feeding assembly 18 via a filling duct 41 and the solenoid valve 24. In addition, a suction connection 43 is provided, via which the cavity 14 can be connected to a pump, not illustrated in the drawing, in order to generate a vacuum.

For coating an interior fitting 29, the latter is inserted into the cavity 14 and the cavity 14 is subsequently evacuated via the suction connection 43. Two components of a liquid surface coating material are fed to the mixing and feeding assembly 18 via the filling connections 21 and 22. In this assembly, the two components are mixed with one another homogeneously and are introduced into the cavity 14 via the solenoid valve 24 and the filling duct 41. Filling may take place, in this case, under increased pressure, for example with the aid of a feed pump, known per se, of the mixing and feeding assembly 18, said feed pump not being illustrated in the drawing. Feeding of the liquid surface coating material into the cavity 14 takes place until said material fills the cavity 14 completely and homogeneously. Subsequently, the outlet 23 of the mixing and feeding assembly 18 is closed by means of the solenoid valve 24 and the molding tool 12 is separated physically from the mixing and metering assembly 18 by means of the transport device 16. This ensures that the curing of the surface coating material takes place under atmospheric pressure and not, by chance, under an overpressure applied by the feed pump of the mixing and feeding assembly 18. Moreover, as a result, after curing, the interior fitting 29 can be removed from the cavity 14 by the two molds 38 and 39 being separated, without this operation being impeded by the mixing and feeding assembly 18.

The curing of the surface coating material may be accelerated by the molding tool 12 being heated and also by the surface coating material being irradiated with UV radiation which may be fed into the cavity 14 via a light guide not illustrated in the drawing.

As already described, after the curing of the surface coating material, the molding tool 12 is opened, so that the surface-coated interior fitting 29 can be removed. Removal may be assisted by ejectors which are not illustrated in the drawing. Further working of the surface of the interior fitting is subsequently unnecessary, and, on the contrary, an appropriate surface quality of the inner wall 34 of the molding tool 12 ensures that the visible side of the interior fitting 29 has a high-gloss surface, a depth effect being brought about by the thickness of the highly transparent surface layer. A synthetic resin on a polyester base is preferably employed as surface coating material.

After the coated interior fitting has been removed from the molding tool 12, a further interior fitting to be coated may be inserted into said tool and the molding tool 12 can subsequently be closed again. The molding tool 12 can then be positioned again by means of the transport device 16, in such a way that its filling duct 41 is flow-connected to the mixing and feeding assembly 18, so that liquid surface coating material can be introduced into the cavity 14, as described above.

What is claimed is:

1. A method for surface coating an interior fitting with a lacquer or resin layer, comprising the steps of:

inserting the interior fitting to be coated into a cavity of a molding tool, an inner wall of said cavity being at a defined distance from a surface of the interior surface to be coated, thereby forming a clearance between the inner wall and the surface to be coated, said clearance extending over the entire surface to be coated and having a substantially constant thickness, and introducing a liquid surface coating material into said clearance for curing therein, said surface coating material having at least two components which are mixed with one another in a mixing and feeding assembly immediately prior to filling of the clearance, wherein after the clearance has been filled, the molding tool is separated from the mixing and feeding assembly and the surface coating material in the clearance is cured substantially under atmospheric pressure.

2. A method according to claim 1, wherein the surface coating material is introduced into the clearance by means of over pressure or under pressure.

3. A method according to claim 1, wherein said inner wall facing the interior fitting surface to be coated is finished with an optical surface quality.

4. A method according to claim 1, wherein said inner wall facing the interior fitting surface to be coated is produced from one of (i)high-grade steel, (ii)rustproof, acid-resistant, hardenable steel, (iii) silicon, (iv) ceramic and (v) aluminum.

5. A method according to claim 1, wherein said inner wall facing the interior fitting surface to be coated is hard-chrome plated.

6. A method according to claim 1, wherein the at least two components of the liquid surface coating material are mixed with one another homogeneously immediately before the filling of the clearance and are fed to the clearance at an approximately constant flow velocity.

7. A method according to claim 1, wherein the surface coating material is fed to the clearance so as to be virtually free of bubbles.

8. A method according to claim 1, wherein a synthetic resin on a polyurethane, polyester, acrylic or epoxy base is used as the liquid surface coating material.

9. A method according to claim 1, wherein:

the liquid surface coating material has sensitizers sensitive to UV radiation, and during curing, the liquid surface coating material is exposed to UV radiation.

10. A method according to claim 1, wherein the molding tool is exposed to heat during the curing of the liquid surface coating material.

11. A method according to claim 1, wherein during curing, the liquid surface coating material is exposed to electromagnetic radiation.

12. A method according to claim 11, wherein said electromagnetic radiation comprises microwave radiation.

13. A method according to claim 1, wherein the coated interior fitting is removed from the molding tool after the curing of the surface coating material and is left without any further surface working of the coated surface.

14. A method according to claim 1, wherein edge regions of the interior fitting are also covered with surface coating material by virtue of a corresponding design of the molding tool.

15. A method according to claim 1, wherein a rear side of the interior fitting is covered at least partially with surface coating material.

16. A method according to claim 1, wherein a material having a solid consistency in its initial state is used as one of the components of the surface coating material.

17. A shaped interior fitting comprising:

a surface coated with a lacquer or resin layer, wherein the surface coating is obtained by inserting the interior fitting prior to coating into a cavity of a molding tool, an inner wall of said cavity being at a defined distance from a visible-side region of the interior fitting surface to be coated, thereby forming a clearance between the inner wall and the surface to be coated, said clearance extending over the entire surface to be coated and having a substantially constant thickness, and by introducing a liquid surface coating material, having at least two components, into the clearance, said two components being mixed with one another in a mixing and feeding assembly immediately before the filling of the clearance, and the surface coating material in the clearance being cured substantially under atmospheric pressure, with the molding tool separated from the mixing and feeding assembly.

* * * * *